J. J. Adams.
Glass Furnace.
RX No 44.
Reissued Aug. 6, 1842.
7014X RELATED DOC
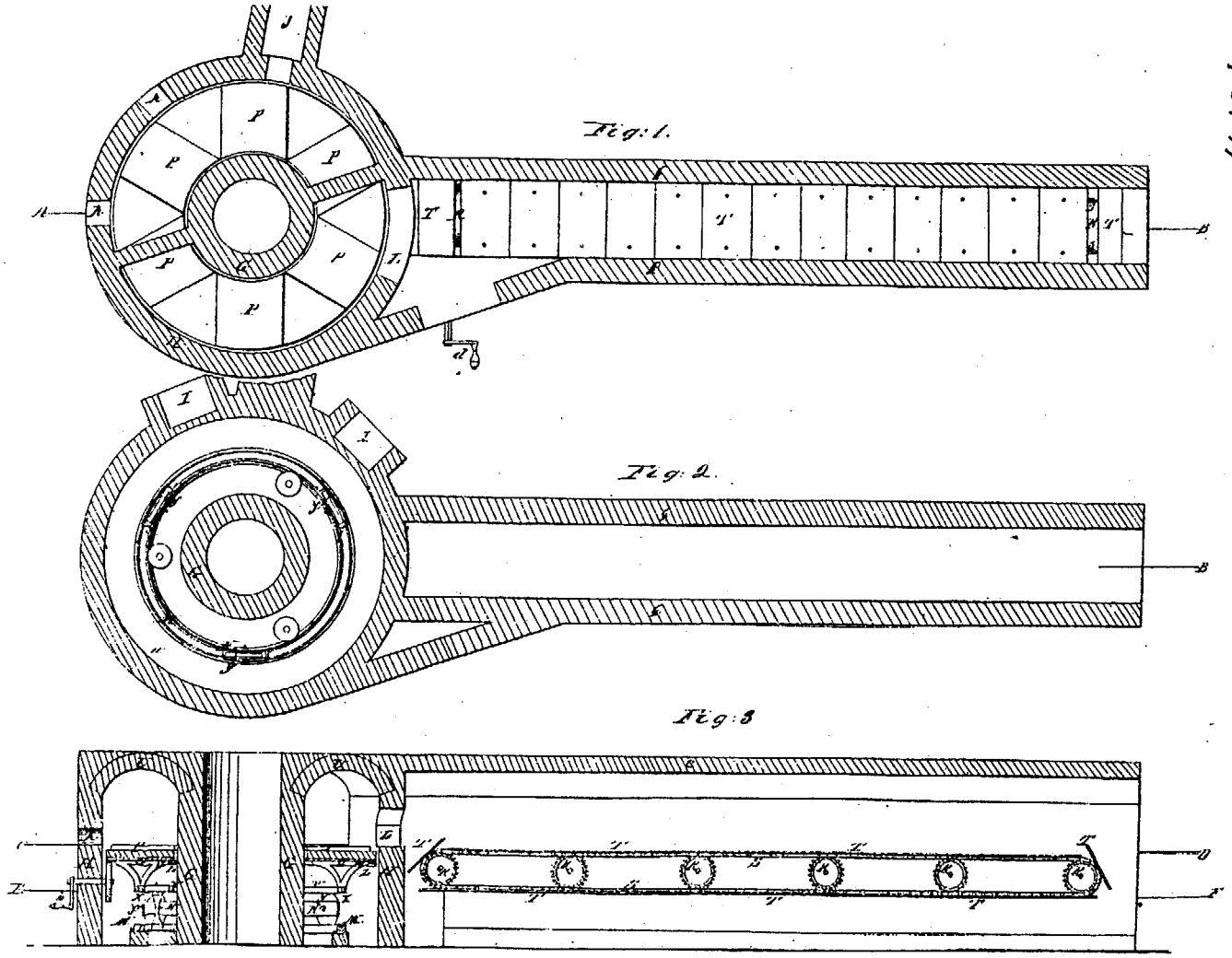

UNITED STATES PATENT OFFICE.

Rx44

JOHN J. ADAMS, OF WINSLOW, NEW JERSEY.

IMPROVEMENT IN THE PROCESS OF FLATTENING WINDOW-GLASS.

7014X RELATED DOC

Specification forming part of Letters Patent dated April 21, 1832; Reissue No. 44 dated August 6, 1842.

*To all whom it may concern:*

Be it known that I, JOHN J. ADAMS, late of the city of Washington, District of Columbia, now residing in the town of Winslow, in the county of Gloucester and State of New Jersey, have made an Improvement in the Process of Flattening and Tempering Window-Glass, which is described as follows:

First. The walls inclosing the revolving platform for flattening the glass are made circular, one inner, G, and one outer wall, H, of such diameters as to leave a space between them of about three feet (more or less) in the clear. They are built of brick or stone. Fire-arches I or flues are made through the outer wall for the admission of fuel. One opening is left near the top of the outer wall for the stick-hole J, through which the glass cylinders are entered. Two other openings at the same height as the former are left for flattening mouths K, and at proper distances for operation. A fourth opening, L, is left near the cooling-apartment for laying off the glass from the aforesaid revolving platform on the cooling or tempering apparatus. An arch, U, springing from the outer and inner wall, closes the hole on the top, covering the several apartments for flattening, &c.

Secondly. A circular railway of cast-iron, M, of about seven feet diameter, furnished either with a groove or a flange, is laid down nearly even with the base of the walls and between them. This railway receives the carriage N and the revolving flattening-platform O, next described.

Thirdly. The revolving flattening-platform O is made with a cast-iron ring, V, furnished on its under side with a groove or a flange, X, similar and corresponding to the one on the railway above described. Between the two grooves or flanges are placed three wheels or rollers, Y, of cast-iron, and of about one foot diameter, and at equal distances from each other. These wheels or rollers support the revolving platform, which is fastened to the aforesaid cast-iron ring, raised to the proper height for operation—say about four feet—by means of arms W between the platform and the cast-iron ring. The platform is cast with a rim of cogs, Z, on its outer periphery and on its under side, and is of such size as to admit of any given number of flattening-stones, P, which is at the option of the operator. A cog-wheel or pinion, *a*, is placed near the stick-hole, the cogs of which mesh into those of the rim on the under side of the platform, and its shaft protrudes through the outer wall, where a crank and handle, *b*, is attached to it.

Fourthly. The cooling apparatus consists of two straight walls, Q, of about thirty feet length and three feet width, covered by an arch, *c*, of the same height as the one over the revolving platform. Under this arch and between these walls are placed a number of plates, T, on two endless chains, S, which revolve over two or more drums. These plates are for laying the glass on when it comes off the flattening-stones on the platform, and to convey it off as the plates become full. For this purpose a crank, *d*, is attached to the end of one of the drum-shafts.

Any other known mechanical movement may be substituted for the endless chains, drums, &c., so as to produce a perpetual tempering oven or arch, as is intended by the inventor, no stoppage occurring from the piles becoming full.

Operation: The cylinder of glass is shoved through the stick-hole and put on one of the intermediate spaces to heat. The flattening-platform is then turned, by means of the crank and cog-wheel above described, till another space presents itself in front of the stick-hole. This brings the first-mentioned cylinder of glass in a line with the first flattening-mouth. The glass is then laid open upon the flattening-stone. The platform is again turned till the first cylinder on the flattening-stones comes in a line with the second flattening-mouth, where it is flattened out. This movement also brings the third space in a line with the stick-hole. The platform is then again turned another space, which brings the first cylinder into the cooling-apartment. As soon as, by turning the platform, three sheets of glass are in the cooling-apartment, then the first sheet is placed upon the first cooling-plate. When the first cooling-plate is filled, then the endless chains, or any other known mechanical contrivance substantially the same preferred for that purpose by the operator, is set in motion and moved the space of one plate, and so on till the whole process is gone through.

This above specification bears reference to

RX 44 the restored model and drawings herewith submitted.

The invention herein claimed, and desired to be secured by Letters Patent, is—

The revolving series of flattening-stones on the rotary platform, and the moving cooling apparatus, on which the glass is laid down to temper, instead of being set up in stationary piles, as formerly done, the whole of the above specified apparatus constructed and operating substantially in the manner and on the principles hereinabove set forth.

JOHN J. ADAMS.

Witnesses:
JAMES S. HALL,
FRANCIS BENNE.